United States Patent [19]
Grober et al.

[11] Patent Number: 5,696,372
[45] Date of Patent: Dec. 9, 1997

[54] HIGH EFFICIENCY NEAR-FIELD ELECTROMAGNETIC PROBE HAVING A BOWTIE ANTENNA STRUCTURE

[75] Inventors: Robert D. Grober, Milford; Robert J. Schoelkopf, III, Branford; Daniel E. Prober, New Haven, all of Conn.

[73] Assignee: Yale University, New Haven, Conn.

[21] Appl. No.: 690,573

[22] Filed: Jul. 31, 1996

[51] Int. Cl.$^6$ .................................................. H01J 3/14
[52] U.S. Cl. ........................... 250/216; 250/308; 343/795
[58] Field of Search .................................. 250/216, 307, 250/308–310; 343/795, 911 L, 807, 841, 821, 725, 700 MS; 359/155, 169, 170, 177

[56] References Cited

U.S. PATENT DOCUMENTS

| | | | |
|---|---|---|---|
| 4,814,783 | 3/1989 | Shelton et al. | 343/795 |
| 4,994,818 | 2/1991 | Keilmann | 343/786 |
| 5,004,307 | 4/1991 | Kino et al. . | |
| 5,121,256 | 6/1992 | Corle et al. | 259/664 |
| 5,125,750 | 6/1992 | Corle et al. | 359/664 |
| 5,166,697 | 11/1992 | Viladevall et al. | 343/807 |
| 5,272,330 | 12/1993 | Betzig et al. | 250/216 |
| 5,286,970 | 2/1994 | Betzig et al. | 250/227.26 |
| 5,286,971 | 2/1994 | Betzig et al. | 250/227.26 |
| 5,288,996 | 2/1994 | Betzig et al. | 250/227.26 |
| 5,288,997 | 2/1994 | Betzig et al. | 250/227.26 |
| 5,288,998 | 2/1994 | Betzig et al. | 250/227.26 |
| 5,354,985 | 10/1994 | Quate | 250/234 |

OTHER PUBLICATIONS

Article: *New Form of Scanning Optical Microscopy* by R.C. Reddick et al. as appeared in Rapid Communications, vol. 39, No. 1, Jan. 1, 1989, pp. 767–770.

Article: *A Suggested Method for Extending Microscopic Resolution into the Ultra–Microscopic Region* by E.H. Synge., May 25, 1928, pp. 356–362.

Article: *Scanning Electromagnetic Transmission Line Microscope with Sub–wavelength Resolution* by M. Fee et al. as appeared in Optics Communications, vol. 69, No. 3,4 on Jan. 1, 1989, pp. 219–224.

Article: *Bow–tie Antennas on a Dielectric Half–Space Theory and Experiment* by Richard C. Compton et al. as appeared in IEEE Transacations on Antennas and Propogation, vol. AP–35, pp. 622–631, Jan. 1987.

Article: *Tailoring a High–transmission Fiber Probe for Photon Scanning Tunneling Microscope* by T. Saiki et al. as appeared in Appl. Phys. Lett. 68(19) on May 6, 1996, pp. 2612–2614.

(List continued on next page.)

*Primary Examiner*—Que Le
*Attorney, Agent, or Firm*—Ohlandt, Greeley, Ruggiero & Perle

[57] ABSTRACT

A near field electromagnetic probe converts an incident energy beam into an interrogating beam which exhibits, in the near field vicinity of the probe, a transverse dimension that is small in relation to the wavelength of the incident energy beam. The probe comprises an energy source for providing the incident energy beam with a wavelength $\lambda$. An antenna is positioned in the path of the incident energy beam and comprises at least a first conductive region and a second conductive region, both of which have output ends that are electrically separated by a gap whose lateral dimension is substantially less than $\lambda$. The electromagnetic system which produces the incident energy should preferably have its numerical aperture matched to the far-field beam pattern of the antenna. Further, the incident beam should have a direction of polarization which matches the preferred polarization of the antenna. The near field probe system of the invention can also sense fields in the near field gap and reradiate these to a far-field optical detector. Thus the probe can serve to both illuminate a sample in the near field gap, and to collect optical signals from an illuminated sample in the near field gap.

21 Claims, 4 Drawing Sheets

OTHER PUBLICATIONS

Article: *Near-field Optics: Microscopy, Spectroscopy, and Surface Modification Beyond the Diffraction Limit* by E. Betzig et al. as appeared in Science. Jul. 10, 1992, vol. 257 pp. 189–195.

Article: *Extreme Sub-wavelength Resolution with a Scanning Radio-frequency Transmission Microscope* by F. Keilmann et al. as appeared in Elsevier Science, Jan. 5, 1996, pp. 1–7.

Article: *Super-resolution Fluorescence Near-field Scanning Optical Micrscopy* by A. Harootinian et al. as published in Appl. Phys. Lett. 49(11) on Sep. 15, 1986, 3 pages.

Article: *Scanning Optical Spectral Microscopy with 500A Spatial Resolution* by A. Lewis et al. as appeared in Biophysical Journal vol. 41, p. 405a; W–AM–Pos25, Jan. 1983.

Article: *Refractive Index Profile in a Goldfish Eye Lens* by D. Lerner et al. as appeared in Biophysical Journal vol. 41, p. 405a; W–AM–Pos26, Jan. 1983.

Article: *Near-field Optical-Scanning Microscopy* by U. Durig, et al. as appeared in J. Appl. phys. 59(1) dated May 15, 1986, pp. 3318–3327.

1

HIGH EFFICIENCY NEAR-FIELD ELECTROMAGNETIC PROBE HAVING A BOWTIE ANTENNA STRUCTURE

FIELD OF INVENTION

This invention relates to near field microscopy and, more particularly, to an improved near field electromagnetic probe which exhibits extraordinary levels of transmission efficiency.

BACKGROUND OF THE INVENTION

In the field of optical microscopy, it is generally acknowledged that the limit of resolution is approximately one-half of the wavelength of the illuminating light or approximately 300 nanometers for visible light. However, as devices and features to be imaged push further into the nanometric regime, the limits of resolution of optical microscopy become obstacles to be overcome so as to achieve visualization of the ever smaller feature sizes. Investigators have used shorter wavelength radiation such as electron or X-ray microscopy to image in the submicron region. Others have employed various forms of scanning probe microscopy in such imaging, wherein the scanning tunneling microscope is a well-known example.

Recently, interest has grown in the field of near field optics as a method for overcoming the resolution limits of optical microscopy. For instance, see "Near Field Optics: Microscopy, Spectroscopy, and Surface Modification Beyond the Diffraction Limit", Betzig et al., Science, Vol. 257, 10 Jul. 1992, pages 189–195.

Betzig et al. indicate that Fourier optics demonstrate that the diffraction limit to resolution in optical microscopy is not a fundamental limitation, but rather arises from the assumption that the detection element (e.g. a lens) is typically many wavelengths away from the sample being imaged. By laterally scanning a source or a detector of light in close proximity to the sample, an image can be generated which exhibits a resolution that is functionally dependent on only the light source (i.e., probe) size and the probe-to-sample separation. Each of these dimensions can, in principal, be made much smaller than the wavelength of light.

Betzig et al. further indicate that the prior art first suggested that a near field optical probe be constructed by use of a subwavelength-diameter aperture in an optically opaque screen. Light incident upon one side of the screen would be transmitted through the aperture and, if the sample was within the near field, would illuminate only one small region at any one time. This technique led to images, in the centimeter wavelength range, at ⅟₆₀ of the wavelength of the illuminating energy.

To obtain a narrow probe to follow surface contours, Lewis et al. (U.S. Pat. No. 4,917,462) constructed a near field optical probe from a drawn pipette. The outside was metallized, with an aperture at the end. Pohl (U.S. Pat. No. 4,604,520) constructed a near field optical probe, using a metallized, pointed quartz rod with an opening in the metal at the pointed end. Both approaches suffered significant intensity losses and scattering of the light before reaching the aperture at the end of the probe.

To achieve improved reliability of fabrication and greater probe beam intensities, Betzig et al. (U.S. Pat. No. 5,272,330) developed a near field optical probe that comprises a tapered optical fiber coated with an aluminum layer. Laser light was coupled into the optical fiber and, after transmission through the fiber, the laser light exited at an aperture at the apex of the probe and illuminated a sample positioned in the near field. The illuminating light, after interaction with the sample, was collected by a conventional lens system. The tapered fiber probe yielded a resolution of down to 12 nanometers, or less than ⅟₄₀ of the wavelength of visible light.

Notwithstanding the ability to achieve levels of resolution substantially less than the wavelength of the illuminating energy, all known near field optical probes exhibit low levels of transmission efficiency. This is not surprising as the essential feature of prior art optical probes is to condense a relatively large cross section electromagnetic beam and to pass it through a very tiny aperture, the result being substantial energy transmission losses in the process. The tapered fiber probe of Betzig et al. exhibits improved transmission efficiencies over other prior art near field probes, however, its efficiency is still orders of magnitude smaller than unity. For example, a probe diameter of ⅟₂₀ of a wavelength will have a transmission efficiency of the order of $10^{-5}$ to $10^{-6}$. This low efficiency limits the use of the tapered fiber probe to applications with either a large photon flux or a slow acquisition rate of reflected or transmitted energy. A large photon flux is often undesirable for biological or molecular systems which are subject to damage or bleaching when subjected to such a flux. Also, applications in which light is sent through and also collected via a tapered fiber suffer large intensity losses during each transit through the aperture.

Another group has attempted to improve the efficiency of a near field probe through the use of a transmission line, such a coaxial line or strip line, to collect and feed the incident energy to the limiting screen aperture. See: Fee et al., "Scanning Electromagnetic Transmission Line Microscope with Sub-Wavelength Resolution", Optics Communications, Vol. 69, No. 3.4, January 1989, pages 219–224. Fee et al. describe a microscope wherein an electromagnetic wave is funneled into an open-ended coaxial line. The center conductor of the coaxial line is configured as a scanning tip and is passed through a ground plane/aperture so as to create an emitting near-field probe.

Fee et al. describe an ultraminiaturized microstrip patch antenna and connected coaxial transmission line wherein a small metal patch approximately ½ wavelength in diameter is deposited on a transparent substrate. The patch forms the body of an antenna, to be illuminated through the transparent substrate. Next, a transparent dielectric layer with a thickness of some fraction of a wavelength is deposited on top of the patch and finally, an opaque metal film is applied over the transparent dielectric and forms both a ground plane for the antenna and the outer conductor of the coaxial transmission line. An aperture is opened in the ground plane, exposing the antenna patch. A scanning tip is then deposited in contact with the metal patch.

Thus, the final configuration comprises an antenna which is illuminated through the substrate to cause an induced field to be created between the patch antenna and the ground plane. The resultant field is then channeled by the coaxial structure to the emitting probe which extends through a small aperture in the ground plane.

Fee et al. indicate that the electrical energy density inside the waveguide structure is substantially improved over that achieved by a simple circular aperture. They further indicate that the field enhancement achieved by the transmission line will provide much higher sensitivities, but will limit the amount of power that can be handled, without melting or dielectric breakdown.

Fee et al., along with all known investigators in the near field microscopy area, have continued to employ a construct which essentially compresses the incident energy so that it can be transmitted, at least in part, through an aperture in an opaque film. As a result, substantial energy losses result.

Accordingly, it is an object of this invention to provide an improved near field electromagnetic probe.

It is another object of this invention to provide an improved near field electromagnetic probe which exhibits a high level of efficiency, as between incident and transmitted energy.

SUMMARY OF THE INVENTION

A near field electromagnetic probe converts an incident energy beam into an interrogating beam which exhibits, in the near field vicinity of the probe, a transverse dimension that is small in relation to the wavelength of the incident energy beam. The probe comprises an energy source for providing the incident energy beam with a wavelength $\lambda$. An antenna is positioned in the path of the incident energy beam and comprises at least a first conductive region and a second conductive region, both of which have output ends that are electrically separated by a gap whose lateral dimension is substantially less than $\lambda$. The electromagnetic system which produces the incident energy should preferably have its numerical aperture matched to the far-field beam pattern of the antenna. Further, the incident beam should preferably have a direction of polarization which matches the preferred polarization of the antenna.

The conductive regions respond to the incident energy beam by establishing a field across the gap which separates the output ends, which field causes re-radiation of an interrogating beam. A target is positioned in sufficient proximity to the gap to be within the near field distance thereof.

The near field probe system of the invention can also sense fields in the near field gap and reradiate these to a far-field optical detector. Thus the probe can serve to both illuminate a sample in the near field gap, and to collect optical signals from an illuminated sample in the near field gap. Because of high transmission efficiencies, the probe can be used as part of a reflection optical microscope, wherein illumination and collection of optical energy are both performed via antenna re-radiation.

DETAILED DESCRIPTION OF THE INVENTION

Figure 1:
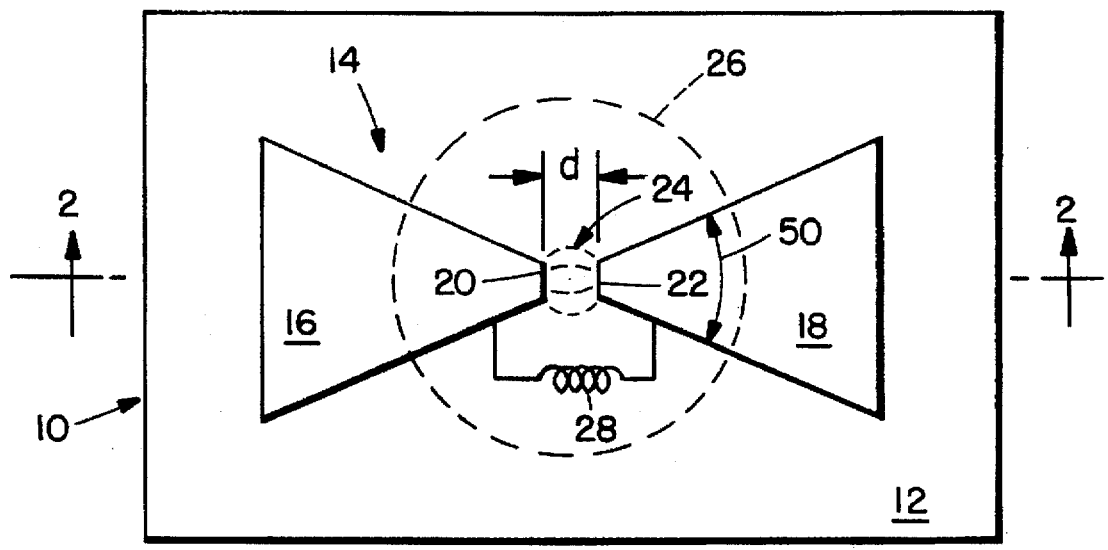
FIG. 1 is a plan view of a near-field electromagnetic probe incorporating the invention.
Figure 2:
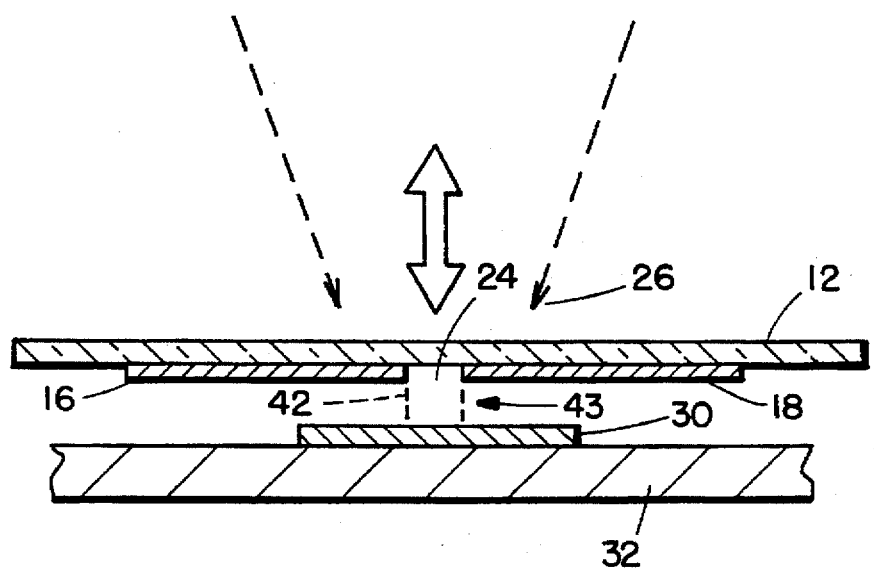
FIG. 2 is a sectional view of the near-field electromagnetic probe of FIG. 1, along line 2—2.
Figure 3:
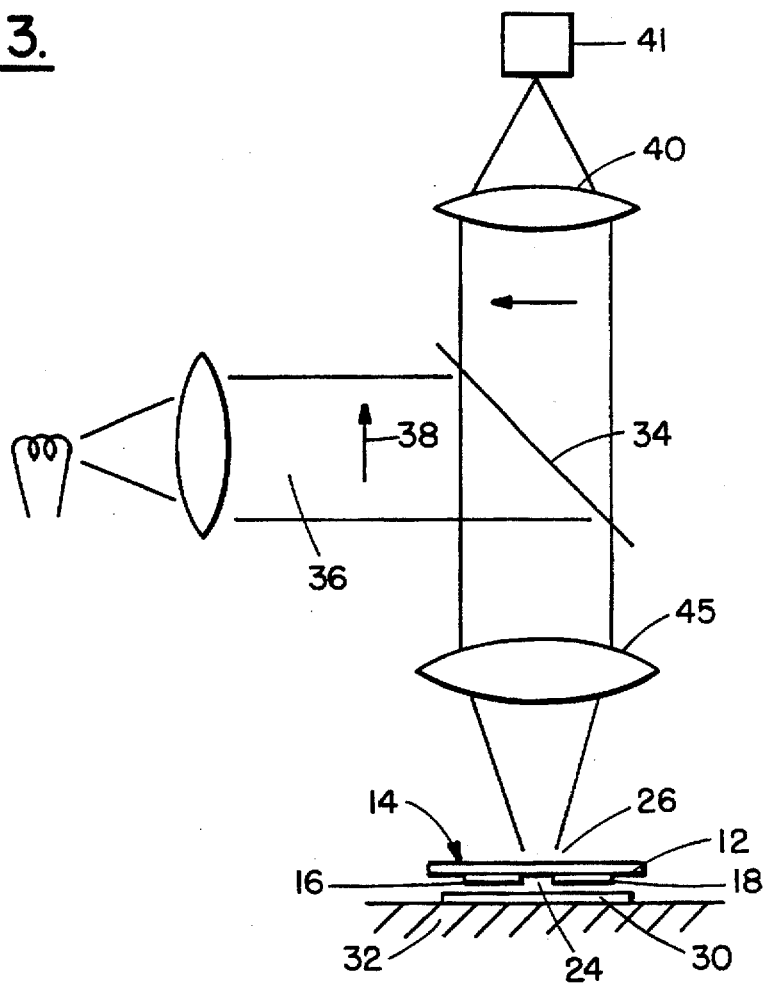
FIG. 3 is a schematic view of an imaging system incorporating an electromagnetic probe incorporating the invention.

Referring now to FIGS. 1–3, a near-field electromagnetic probe 10 (hereafter referred to as "probe"), comprises an electromagnetically transparent substrate 12 upon which an antenna structure 14 is supported. In the form shown in FIGS. 1 and 2, antenna structure 14 comprises a bowtie antenna including conductive arms 16 and 18, respectively. At terminations 20 and 22, conductive arms 16 and 18 are separated by a gap 24 having a transverse dimension d. In essence, conductive arms 16 and 18 form a dipole-like antenna. Other antenna structures will work with the invention, such as log-periodic, spiral and slot antennas.

Gap 24 forms an emission "region" between terminations 20 and 22 of conductive arms 16 and 18. The transverse dimension "d" between terminations 20 and 22 is small in relation to the wavelength of the incident electromagnetic energy.

It is preferred that the incident energy have a wavelength in the optical range, however, it is to be understood that the invention is equally applicable to non-optical wavelength applications. Incident energy beam spot 26 is indicated by a circular dashed line in FIG. 1 and preferably exhibits a diffraction limited spot diameter, i.e., not more than $2\lambda$.

From a review of FIGS. 1 and 2, it can be seen that terminations 20 and 22, separated by gap 24, constitute a capacitance. In order to more efficiently impedance match the capacitance of gap 24 to the antenna structure, and improve the coupling of energy thereunto, it is preferred to connect an inductor 28 in parallel with region 24 to create a tuned circuit. The essential idea is to match the antenna impedance to the radiation resistance of the dipole radiator formed at gap 24.

As shown in FIGS. 2 and 3, substrate 12 is positioned sufficiently close to a target 30 (positioned on a support 32) to place the upper surface of target 30 in the near-field of probe energy created by the field created within gap 24. Antenna structure 14 is illuminated (via half-silvered mirror 34) by a polarized beam 36, whose direction of polarization 38 is oriented along the direction of preferred polarization of antenna structure 14. An optic 40 is positioned above half-silvered mirror 34 and focuses the reradiated energy from antenna structure 14 onto a detector 41.

The underlying and critical finding in this invention is that incident beam spot 26 is acted upon by conductive arms 16 and 18 in such a manner as to localize substantially all of the energy within incident beam spot 26 in the vicinity of gap 24 between terminations 20 and 22. Thus, even though substrate 12 is transparent at the wavelength of incident beam spot 26, antenna structure 14 essentially "collapses" the incident beam spot by concentrating its energy into currents on conductive arms 16 and 18 and focusing the induced currents to output terminals 20 and 22. Since output terminals 20 and 22 are nearly open-circuited at the frequency of incident beam spot 26, charge accumulates at terminations 20 and 22, resulting in a displacement current flow across gap 24. The displacement current causes a re-radiation similar to that of a Hertzian dipole of dimension d.

Since gap 24 can be made much smaller than the wavelength of the incident energy spot 26, a beam 42 is created (see FIG. 2) which, in near-field 43, has a cross-sectional diameter approximately equal to d. Thus, in near-field 43, interrogating beam 42 is created, having the frequency of the incident beam, but a transverse dimension that is small in relation to the wavelength of the incident beam. Importantly, no pinhole or other apertured plate is required to achieve interrogating beam 42.

In the collection mode, aperture 24 is placed close to sample 30. Aperture 24 senses electromagnetic emissions from target 30 in near field region 43 (as a result of off-axis illumination, illumination from beneath target 30 or self induced emanations, e.g., fluorescence). Currents are induced thereby into antenna arms 16 and 18 and, as a result, the induced energy is reradiated up through optic 45, mirror 34 and is focussed by optic 40 onto detector 41. Probe 10 serves as a reflection microscope when an interrogating beam 42 is reflected from sample 30 back to gap 24. In the same manner as for the collection mode, currents are induced into antenna arms 16 and 18 and the induced energy is reradiated via optic 45, mirror 34 to optic 40.

Experimental Results

To demonstrate that the antenna of FIGS. 1 and 2 generates localized radiation, a scale model system was built at 2.15 GHz ($\lambda=14$cm). The experimental configuration was similar to that shown in FIGS. 1 and 2; however, incident beam 26 was formed by an open-ended rectangular waveguide positioned 2.5 cm in the front of bowtie antenna 14. The antenna had an opening angle 50 of 90° and a total length of 30 cm. The output terminals of the antenna formed a square gap of width 7 mm or approximately ($1/20$)$\lambda$. The field intensity produced by the antenna was detected using a dipole probe of dimension $\lambda/20$, integrated with a coaxial balun. The dipole probe measured local energy density or field intensity.

Figure 4A:
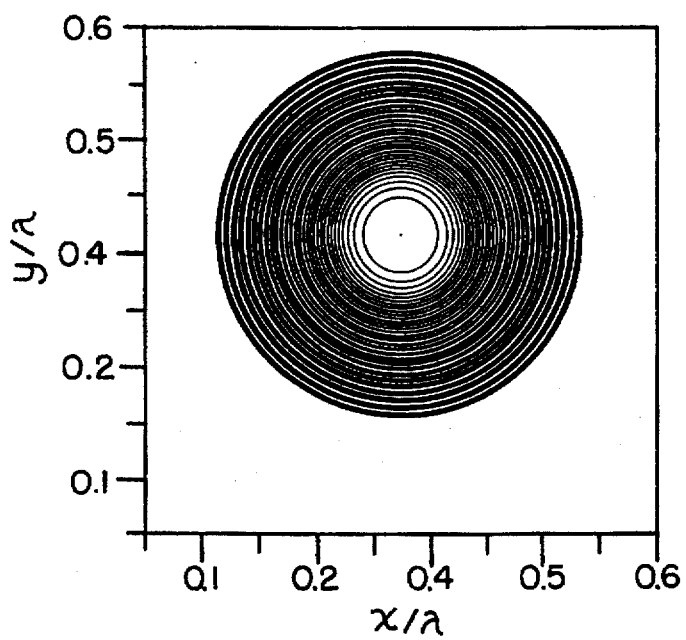
FIG. 4a is a plot of field intensity profile for an electromagnetic beam that is incident upon the antenna of FIG. 1, the incident beam having a frequency of 2.15 GHz.

As shown in FIG. 4a, the field intensity profile due to the waveguide (i.e. without antenna 14 positioned in front of the waveguide) is roughly Gaussian with a diameter on the order of 7 cm or approximately $\lambda/2$.

Figure 4B:
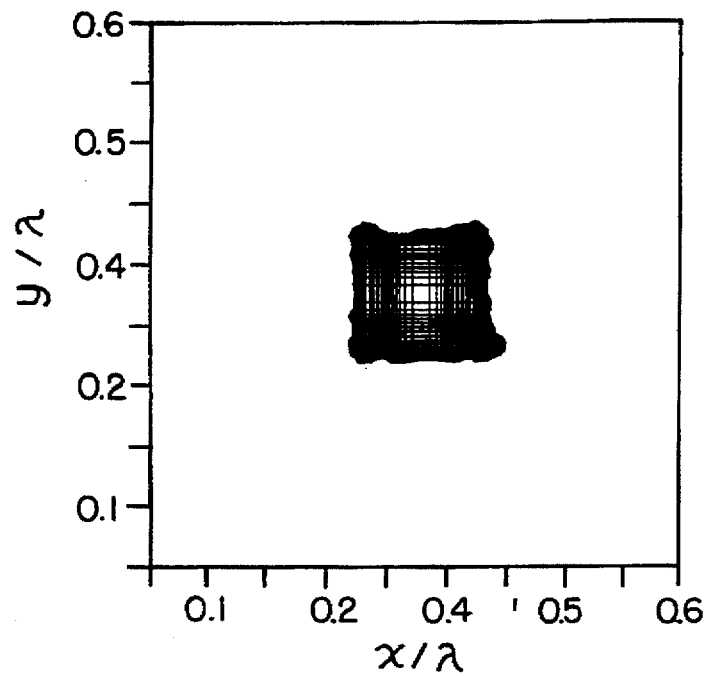
FIG. 4b is a plot of field intensity profile derived 2 mm beyond the plane of the antenna.

The field intensity radiated by the bowtie antenna was measured by scanning a dipole probe, positioned a fixed distance from the plane of the bowtie on the side of the antenna structure opposite to that from which it was irradiated. An image taken 2 mm ($\lambda/75$) in the near field emission area of the bowtie, is shown in FIG. 4b. The field was strongly localized in gap 24 of the antenna and evidenced a transverse dimension of approximately $\lambda/20$.

Figure 5:
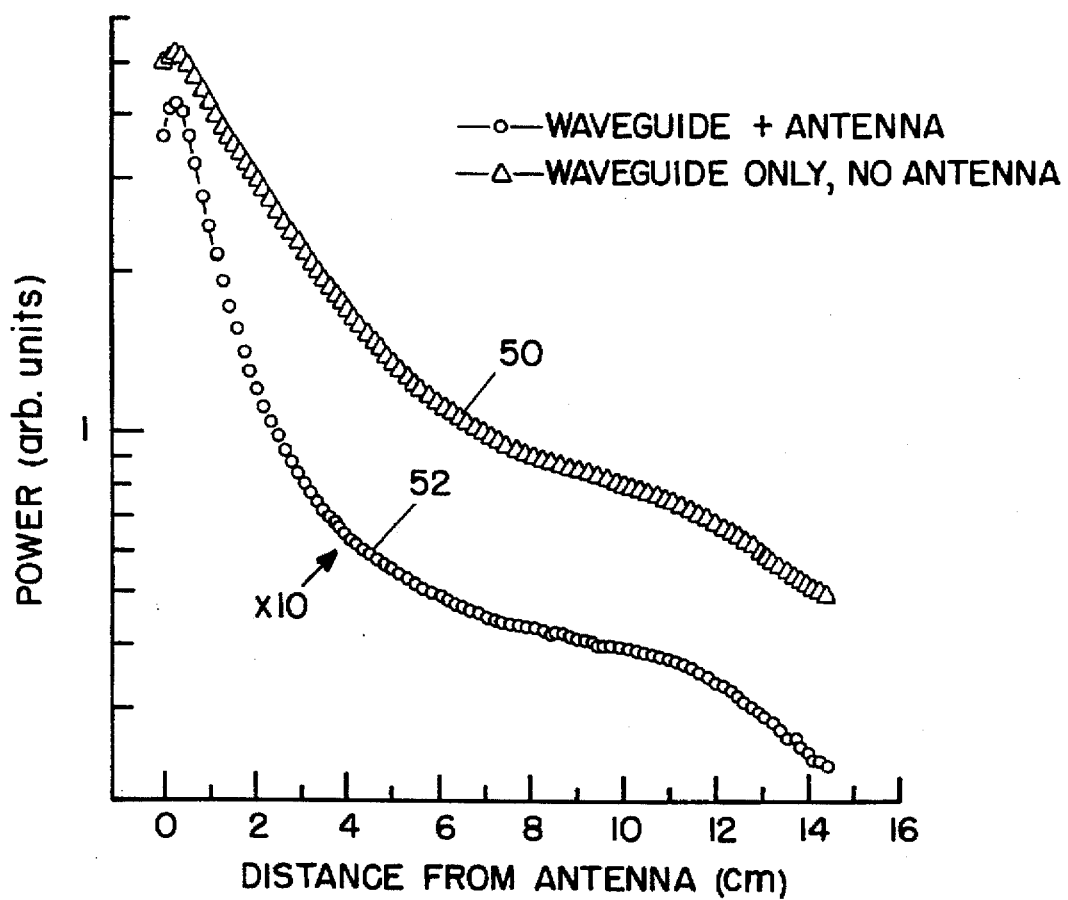
FIG. 5 is a plot of detected power along the direction of propagation, as measured in the far-field, with (i) a feed waveguide only present and (ii) with both the feed waveguide and the antenna present.

The unique aspect of the invention is that it exhibits very large transmission efficiencies. Shown in FIG. 5 are measurements of intensity taken along the Z axis (perpendicular to the plane of antenna 14). Plot 50 shows the intensity as measured without antenna 14 present (i.e., the open waveguide). Plot 52 shows the measured field intensity (x10) with antenna 14 present. Both curves scale as an inverse square law in the far-field. The ratio of the far-field intensities suggests a transmission efficiency of the order of 5%. While this efficiency is, at best, an estimate (because it does not properly take into account differences between the far-field patterns of the antenna and the open wave guide), it is clear that the transmission efficiency of probe 10 is many orders of magnitude improved over the prior art tapered fiber probes.

To achieve a near unity transmission efficiency, the impedance of the antenna structure should be matched to the impedance of the capacitance created between output terminals 20 and 22. For instance, bowtie antenna 14 (without tuning inductor 28) could be shown to have an impedance of approximately 188 ohms. The antenna is coupled to gap 24 which looks like a capacitor in series with the radiative resistance of a Hertzian dipole. The radiative resistance of a Hertzian dipole of length d=$\lambda$ (approximately 7 mm) can be shown to be approximately 2 ohms. Provided the capacitance is large enough, the efficiency calculated is in the order of 4%. This compares well with the experimental results and indicates that proper antenna design will yield higher efficiencies.

While the above probe structure has been described in the context of a bowtie structure, those skilled in the art will realize that other antenna structures which provide a high field strength across electrically isolated terminals are equally useful in generating near-field radiative energy beams. Further, while the invention was tested utilizing a 2.15 GHz incident beam, a preferred embodiment will utilize an optical beam in the visible region of the electromagnetic spectrum as the incident beam, thereby creating an induced interrogating beam in the visible.

The invention can be incorporated into a scanned probe microscope via many techniques. For instance, the antenna can be fabricated on the bottom of a solid immersion lens or designed as a part of conventional atomic force probe. The highest energy photons for which the antenna can be used will be limited by the finite absorption of light in the metal that defines the antenna. The effect of the finite conductivity can be determined quantitatively by considering the propagation of surface waves at a metal-air interface. The decay length of a wave along the surface of a metal antenna can be calculated and is plotted in FIG. 6 for aluminum and gold across the visible spectrum, using values reported in the literature. Since the antenna will be illuminated by a diffraction limited laser spot, the surface wave needs to propagate, at most, of the order of $\lambda$.

Figure 6:
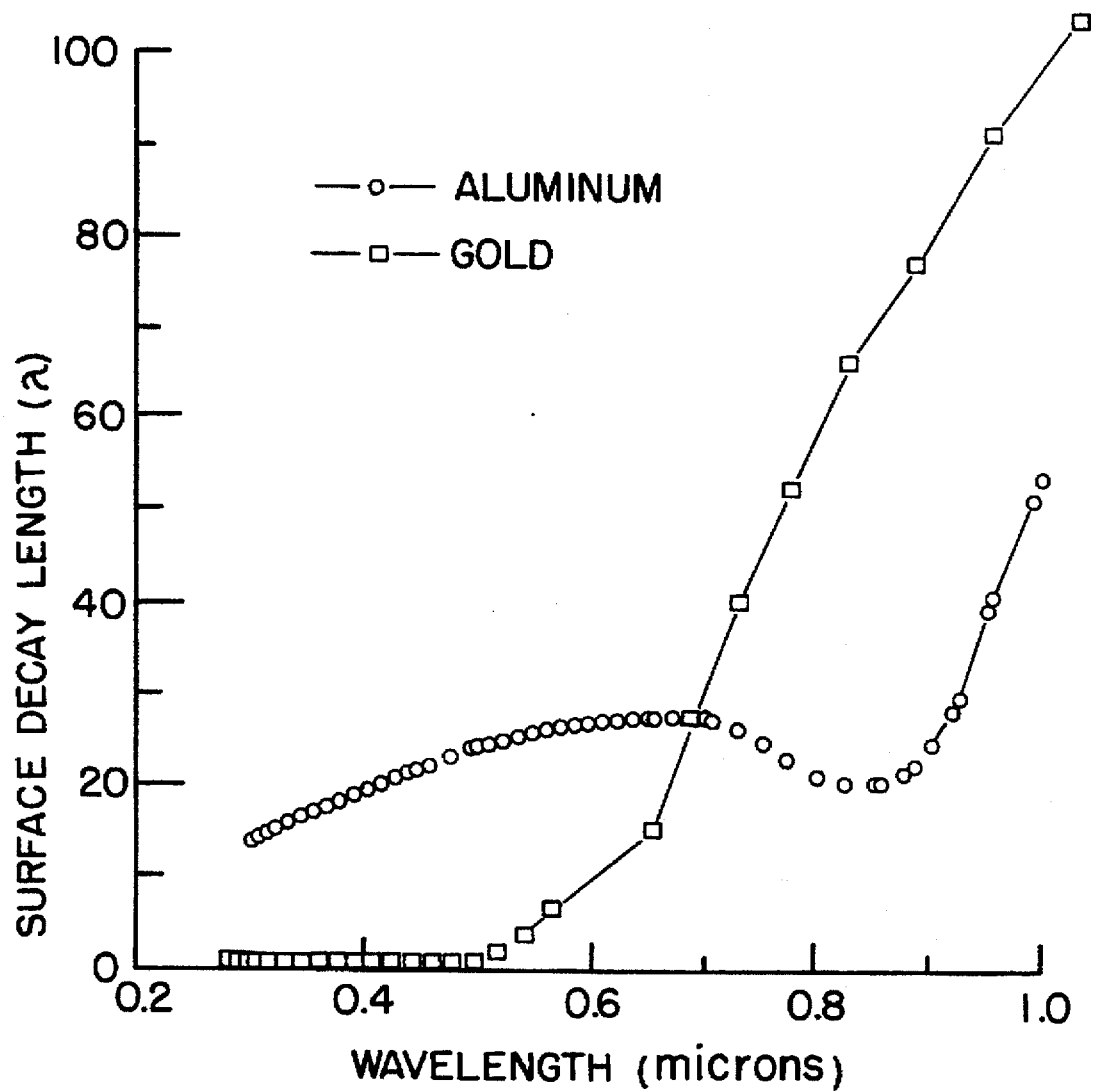
FIG. 6 is a plot of calculated surface wave decay length as a function of photon wavelength for both aluminum and gold antenna structures.

From the plot of FIG. 6, it is clear that gold is the metal of choice for wavelengths as short as 0.7 microns. Using an antenna arm length of 10$\lambda$ as a conservative criteria, aluminum will work efficiently to the near ultraviolet.

Use of inductor 28 was shown to dramatically increase the transmission efficiency as measured in the microwave frequency region. Inductor 28 forms a resonant circuit with the gap capacitance, and this inductor-capacitor combination forms a resonant circuit at the frequency of the incident microwave beam. For optical frequencies, various approaches can be used to implement an element which acts as an inductor. Metal structures and also various dielectric materials with resonances at frequencies near that of the incident beam, may be used. Alternatively, a resonant optical cavity may be utilized in the input beam so that there is more efficient coupling of the incident beam energy to the radiation resistance of the gap. This may be implemented in an integrated form if the antenna is mounted on the end of an optical fiber, so that a fiber resonator can then be used.

Reflections of incident energy may occur from the antenna structure in the absence of a target and be detected by detector 41. To distinguish such reflections from energy reflected from a target, the target is scanned in the two planar dimensions and the reflection data from the antenna structure is subtracted as a background signal. This technique is needed when the observing wavelength is the same as the incident wavelength. If instead, the target emanates a different wavelength (i.e., fluoresces), a filter can be used to exclude the reflections due to the incident beam.

It should be understood that the foregoing description is only illustrative of the invention. Various alternatives and modifications can be devised by those skilled in the art without departing from the invention. For instance, while the probe described above has been described in both illumination and collection configurations, it can be used simultaneously for both functions if the illumination and collection wavelengths are offset or are differently polarized. Accordingly, the present invention is intended to embrace all such alternatives, modifications and variances which fall within the scope of the appended claims.

What is claimed is:

1. A near-field electromagnetic probe for converting an incident energy beam into an interrogating beam which, in a near-field vicinity of the electromagnetic probe, exhibits a transverse dimension that is small in relation to the wavelength of the incident energy beam, the probe comprising:

an energy source for directing said incident energy beam along a path, said incident energy beam having a wavelength $\lambda$;

an antenna positioned in said path, said antenna comprising a first conductive region and a second conductive region separated by a gap, said gap having a transverse dimension that is substantially less than $\lambda$, said antenna, when irradiated by said incident beam, creating a field across said gap which causes a re-radiation of an interrogating beam exhibiting an approximate transverse dimension of said gap in a near-field region with respect thereto; and a target support for placing a target sufficiently close to said gap to be within said near-field region of said interrogating beam.

2. The near-field electromagnetic probe as recited in claim 1, further comprising;

impedance means connected between said first conductive region and second conductive region which, in combination with capacitance across said gap, creates a resonant circuit at a frequency of said incident energy beam.

3. The near-field electromagnetic probe as recited in claim 1, wherein said first conductive region and second conductive region comprise a bowtie antenna structure.

4. The near-field electromagnetic probe as recited in claim 1, wherein said first conductive region and second conductive region are mounted on a substrate that is substantially transparent to said incident energy beam and said interrogating beam.

5. The near-field electromagnetic probe as recited in claim 4, wherein said substrate is continuous in a vicinity of said gap.

6. The near-field electromagnetic probe as recited in claim 1, wherein said incident energy beam exhibits a wavelength $\lambda$ in a visible range of the electromagnetic spectrum.

7. The near-field electromagnetic probe as recited in claim 1, wherein said incident energy beam is polarized.

8. The near-field electromagnetic probe as recited in claim 7, wherein a direction of polarization of said incident beam is aligned with a preferred direction of polarization of said antenna.

9. The near-field electromagnetic probe as recited in claim 1, wherein said incident energy beam is focused onto said antenna.

10. The near-field electromagnetic probe as recited in claim 9, wherein said incident energy beam produces a diffraction limited spot with a diameter no greater than $2\lambda$.

11. The near-field electromagnetic probe as recited in claim 1, further comprising:

means positioned so as to collect radiated energy from said antenna, upon said first conductive region and second conductive region being induced to radiate energy as a result of energy emitted from said target into said gap.

12. A near-field electromagnetic probe for use with electromagnetic energy having a wavelength $\lambda$, said probe comprising:

a target support for holding a target;

an antenna comprising at least a first conductive region and a second conductive region, said first conductive region and second conductive region separated by a gap, said gap having a transverse dimension that is substantially less than $\lambda$, said antenna positioned sufficiently close to said target to place said target within a near-field region of said gap; and means for causing electromagnetic emission of wavelength $\lambda$ from said target, with said antenna responsive to electromagnetic energy of wavelength $\lambda$ emitted from said target that is within said gap, to induce currents in said first conductive region and second conductive region indicative of intensity of said emitted energy within said gap.

13. The near-field electromagnetic probe as recited in claim 12, further comprising:

means positioned to collect radiated energy of wavelength $\lambda$ from said antenna, upon said first conductive region and second conductive region being induced to radiate energy as a result of currents induced thereinto by said emitted electromagnetic energy from said target.

14. The near-field electromagnetic probe as recited in claim 12, further comprising;

impedance means connected between said first conductive region and second conductive region which, in combination with capacitance across said gap, creates a resonant circuit at a frequency of said electromagnetic energy of wavelength $\lambda$.

15. The near-field electromagnetic probe as recited in claim 12, wherein said first conductive region and second conductive region comprise a bowtie antenna structure.

16. The near-field electromagnetic probe as recited in claim 12, wherein said first conductive region and second conductive region are mounted on a substrate that is substantially transparent to said electromagnetic energy of wavelength $\lambda$.

17. The near-field electromagnetic probe as recited in claim 16, wherein said substrate is continuous in a vicinity of said gap.

18. The near-field electromagnetic probe as recited in claim 12, wherein said wavelength $\lambda$ is in a visible range of the electromagnetic spectrum.

19. The near-field electromagnetic probe as recited in claim 12, wherein said electromagnetic energy of wavelength $\lambda$ is polarized.

20. The near-field electromagnetic probe as recited in claim 13, wherein said electromagnetic energy of wavelength $\lambda$ is polarized.

21. The near-field electromagnetic probe as recited in claim 20, wherein a direction of polarization of said electromagnetic energy is aligned with a preferred direction of polarization of said antenna.

* * * * *